United States Patent [19]
Preller

[11] Patent Number: 5,748,461
[45] Date of Patent: May 5, 1998

[54] SMPS WITH LOW LOAD SWITCHING FREQUENCY STABILIZATION

[75] Inventor: Peter Preller, München, Germany

[73] Assignee: Siemens Aktiengesellschaft, Munich, Germany

[21] Appl. No.: 666,098

[22] Filed: Jun. 19, 1996

Related U.S. Application Data

[63] Continuation of PCT/DE95/01449, Oct. 18, 1995, published as WO96/13092, May 2, 1996.

[30] Foreign Application Priority Data

Oct. 19, 1994 [DE] Germany ............... 44 37 459.3

[51] Int. Cl.$^6$ ............................... H02M 7/539
[52] U.S. Cl. ........................ 363/97; 363/21; 363/131
[58] Field of Search ................. 363/20, 21, 95, 363/97, 131

[56] References Cited

U.S. PATENT DOCUMENTS

| | | | |
|---|---|---|---|
| 4,593,347 | 6/1986 | Peruth et al. | 363/21 |
| 4,928,220 | 5/1990 | White | 363/21 |
| 4,984,145 | 1/1991 | Dungschat et al. | 363/19 |
| 4,985,818 | 1/1991 | Niederreiter | 363/21 |
| 5,170,333 | 12/1992 | Niwayama | 363/21 |
| 5,317,499 | 5/1994 | Brakus | 363/21 |
| 5,448,469 | 9/1995 | Rilly et al. | 363/97 |
| 5,497,311 | 3/1996 | Hanawaka | 363/97 |

FOREIGN PATENT DOCUMENTS

| | | | |
|---|---|---|---|
| 0 380 033 | 8/1990 | European Pat. Off. | H02M 3/335 |
| 33 12 209 | 10/1984 | Germany | H02P 13/22 |

*Primary Examiner*—Jeffrey L. Sterrett
*Attorney, Agent, or Firm*—Herbert L. Lerner; Laurence A. Greenberg

[57] ABSTRACT

A switch-mode power supply has a control device with an input for a control voltage which is coupled to a secondary voltage and an output for controlling a transistor that is connected in series with a primary winding of a switch-mode power supply transformer. The control device additionally includes a device for inhibiting the switching transistor from switching on again when a control error that is formed in the control device is less than a reference value. The control signal input and the output of the control device are coupled through a coupling element having a low-pass filter characteristic. A switching-on pulse for the switching transistor is consequently superimposed on the control voltage, with a time delay. If the load to be supplied is small (standby mode), the switching of the switching transistor is inhibited until the switching-on pulse which is coupled to the control voltage has decayed. A stable switching frequency slightly above the audibility limit can be set for the standby mode. The power loss is accordingly low.

7 Claims, 2 Drawing Sheets

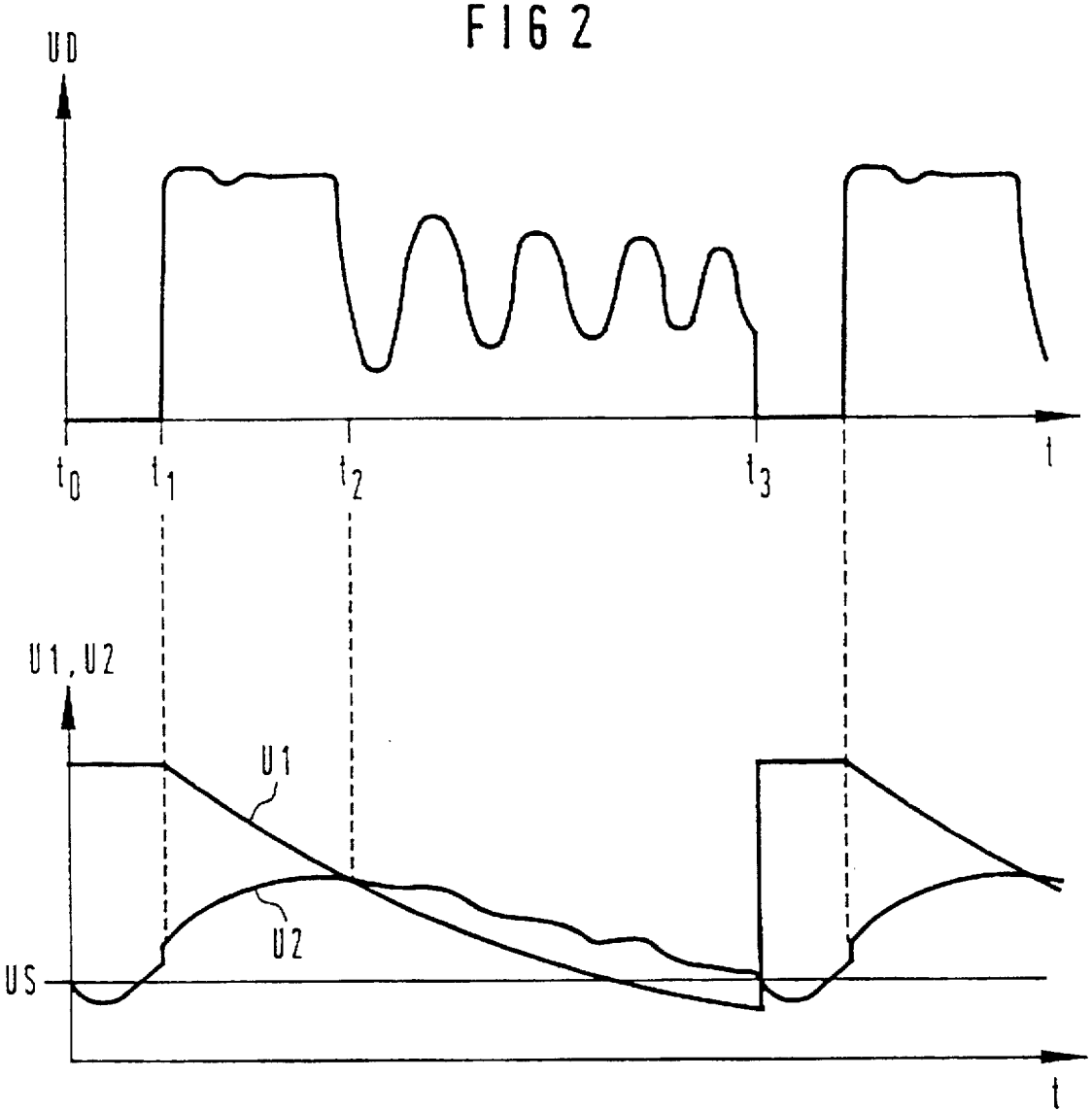

SMPS WITH LOW LOAD SWITCHING FREQUENCY STABILIZATION

CROSS-REFERENCE TO RELATED APPLICATION

This application is a Continuation of International Application Serial No. PCT/DE95/01449, filed Oct. 18, 1995 published as WO96/13092, May 2, 1996.

BACKGROUND OF THE INVENTION

Field of the Invention

The invention relates to a switch-mode power supply including a transformer having a primary winding and a secondary winding for connection of a load, a switching transistor which is connected in series with the primary winding of the transformer and through the use of which a rectified voltage can be applied in a pulsed manner to the primary winding of the transformer, as well as a control device which has an output for controlling the switching transistor, a zero-crossing signal input which is controlled by a voltage induced in the transformer, a control signal input which is controlled by a voltage coupled to the secondary voltage, and a device for inhibiting the switching transistor from switching on when the magnitude of a control error derived from the control signal is less than a threshold value.

In a switch-mode power supply, it is known for the current which flows through the primary winding of the switch-mode power supply transformer to be chopped through the use of a switching transistor. The voltage pulses induced in the secondary side of the transformer are rectified and smoothed in order to supply a load with DC voltage. The switched-on and switched-off phases of the switching transistor are controlled by the control device as a function of the load in such a manner that a secondary voltage is produced which is as independent of the load as possible and is stabilized at a constant level.

In the case of switch-mode power supplies having a free-running control device, the zero crossing of a voltage which is induced in the transformer is evaluated in a known manner in the control device in order to consequently switch on the switching transistor. That ensures that the transformer is demagnetized at the instant when the switching transistor is switched on. The instant when the switching transistor is switched off is defined as a function of a control voltage, which is coupled to the output voltage on the secondary side. A voltage signal which simulates the primary current is also produced for this purpose, especially in the case of a switch-mode power supply having the TDA 4605 integrated circuit from the firm Siemens. The switching transistor is switched off whenever the primary current signal exceeds a control error formed from the control voltage.

If the load which is to be supplied is small, as is normally the case in the standby mode of the electronic equipment to be supplied, the output voltage and the switching frequency in such free-running switch-mode power supplies would rise to a relatively high level without further switching measures. In order to avoid that, the TDA 4605 integrated circuit has a circuit device which inhibits the switching transistor from switching on repeatedly when the control error is less than a threshold value.

In the case of a switch-mode power supply disclosed in Published European Patent Application 0 124 734 A, corresponding to U.S. Pat. No. 4,593,347, a coupling capacitor is provided between the input for the zero-crossing signal and the input for the control voltage of the control circuit. In consequence, the zero-crossing signal is coupled to the control voltage. That results in the control voltage being reduced at the instant of switching on. In consequence, the control error is increased, so that the primary current rises to a relatively high level, and the secondary voltage is briefly increased. That in turn ensures that the control voltage is at a relatively high level at the next zero crossing, in such a way that the control error is small. With an appropriate structure, the control error is less than the inhibition threshold which is also provided in that case for switching the switching transistor on again, so that the switching transistor is inhibited from switching on for a number of zero crossings until the control voltage has fallen so far that the threshold is no longer effective. The coupling between the zero-crossing signal input and the control signal input accordingly ensures that the switching frequency is reduced when the load on the switch-mode power supply on the secondary side is small.

It has been found that, as a result of the known solutions, the switching frequency for a low load, for example in the standby mode, can be only relatively coarsely set. Since the switching frequency should always be above the audibility range of about 20 kHz, a relatively large safety margin must be maintained. Furthermore, the described solutions are not frequency-stable. As the result of the influence of parasitic elements, the switching frequency is subject to fluctuations, so that it is possible for the switching frequency to fall briefly into the audibility range.

SUMMARY OF THE INVENTION

It is accordingly an object of the invention to provide a switch-mode power supply, which overcomes the hereinafore-mentioned disadvantages of the heretofore-known devices of this general type in such a way that a switching frequency when a load on the secondary side is low (standby mode) can be set as accurately as possible and with as stable a frequency as possible to a reduced value, which is preferably slightly above an audibility threshold.

With the foregoing and other objects in view there is provided, in accordance with the invention, a switch-mode power supply, comprising a transformer having a primary winding and a secondary winding for connection of a load; a switching transistor being connected in series with the primary winding of the transformer for applying a rectified voltage in a pulsed manner to the primary winding of the transformer; a control device having an output connected to the switching transistor for controlling the switching transistor, a zero-crossing signal input being connected to the transformer and being controlled by a voltage induced in the transformer, a control signal input being controlled by a voltage coupled to a secondary voltage, and a device connected between the control signal input and the output of the control device for inhibiting the switching transistor from switching on when a control error derived from the control signal has a magnitude being less than a threshold value; and a coupling element coupling the output and the control signal input of the control device, the coupling element having a low-pass filter characteristic.

In the case of the switch-mode power supply according to the invention, the safety margin for the switching frequency from the audibility range can be selected to be relatively low in the standby mode. The standby switching frequency is preferably set just above the audibility range, for example between 20 kHz and 25 kHz. As a result of this low switching frequency, the switching losses which essentially occur in the switching transistor are relatively low. The standby power loss is thus small.

The coupling element ensures that the positively-going switching pulse at the output of the control device is coupled in a low-pass-filtered manner to the control voltage. In consequence, the control voltage is increased so that the control error formed in the control device falls below the inhibition threshold formed in the control device. In consequence, the switching transistor is inhibited from switching on throughout a number of subsequent zero crossings of the induced transformer voltages. The switching transistor is not allowed to switch on again until the low-pass-filtered, delayed switching-on pulse has decayed and the control voltage supplied to the control device correspondingly falls. The number of masked-out zero crossings, and in consequence the switching frequency of the power supply, can be set relatively exactly by appropriate setting of the time constant of the low-pass filter.

In accordance with another feature of the invention, the coupling element has an input side, an output side, an input connected to the output of the control device, an output connected to the control signal input, a pulse storage device on the input side and an element with an RC characteristic on the output side.

In accordance with a further feature of the invention, the pulse storage device includes a capacitor and a resistor connected in a parallel circuit, and a diode connecting the parallel circuit to the output of the control device.

In accordance with an added feature of the invention, the coupling element includes a coupling capacitor for a DC voltage output connecting the pulse storage device to the RC element on the output side.

In accordance with an additional feature of the invention, there is provided an amplifier connected between the pulse storage device and the element having an RC characteristic.

In accordance with yet another feature of the invention, there is provided a capacitive coupling of the zero-crossing signal input and the control signal input of the control device.

In accordance with a concomitant feature of the invention, the transformer has another secondary winding, and there is provided an optocoupler connecting the control signal input of the control device to the other secondary winding.

Other features which are considered as characteristic for the invention are set forth in the appended claims.

Although the invention is illustrated and described herein as embodied in a switch-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 2 is a signal diagram showing signals occurring in the switch-mode power supply of FIG. 1.

DESCRIPTION OF THE PREFERRED EMBODIMENTS

Figure 1:
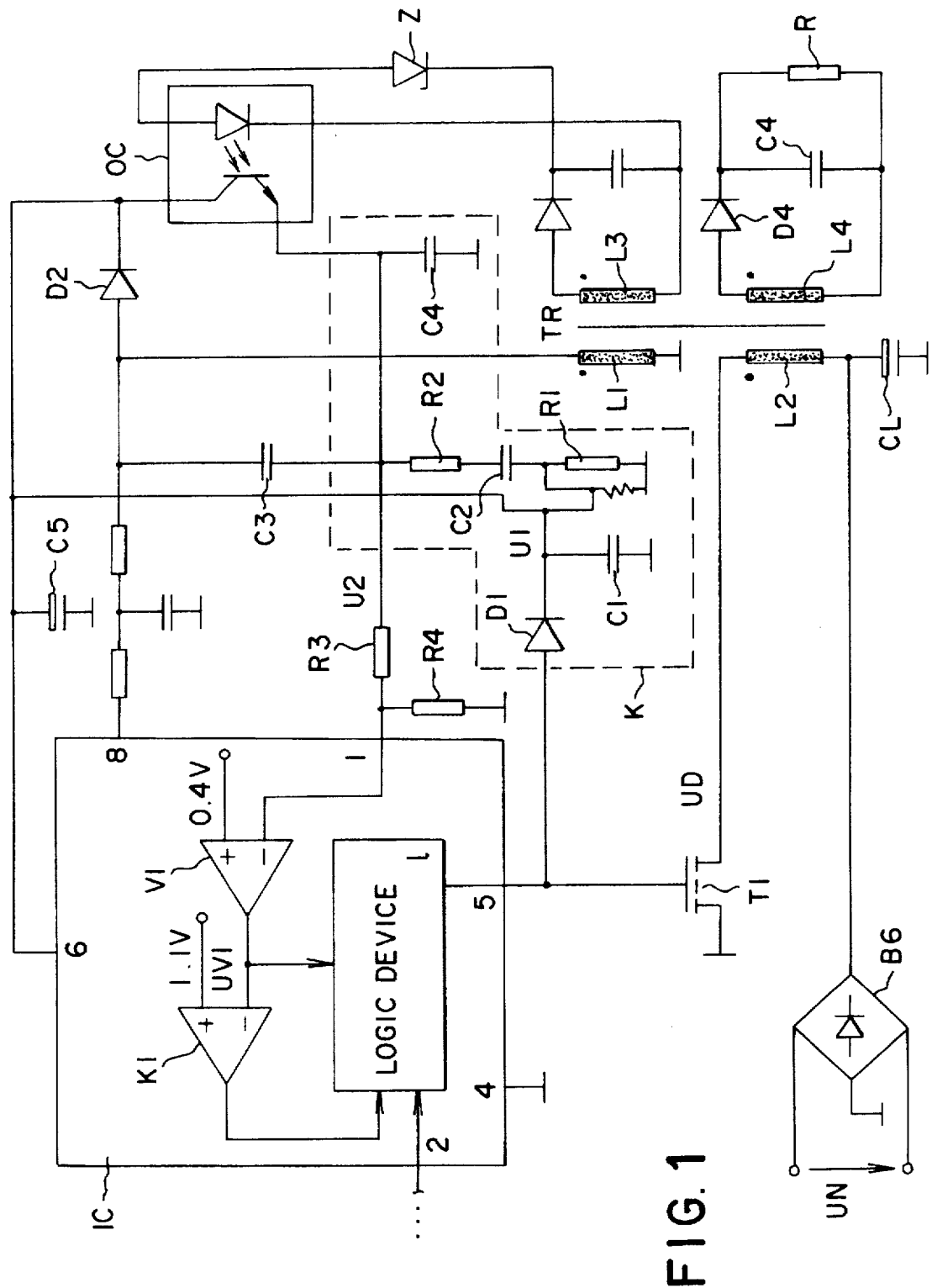
FIG. 1 is a schematic and block circuit diagram showing essential parts of a switch-mode power supply according to the invention.

Referring now to the figures of the drawings in detail and first, particularly, to FIG. 1 thereof, there is seen a switch-mode power supply which has a transformer TR with two primary windings L1, L2 and two secondary windings L3, L4. A switching transistor T1 is connected in series with the primary winding L2. A current path which is formed from the switching transistor T1 and the primary winding L2 is supplied with a rectified mains AC voltage UN from the output side of a bridge rectifier BG. The rectified mains AC voltage is smoothed in a charge capacitor CL. A load R is connected through a rectifier diode D4 and a smoothing capacitor C4 to the secondary winding L4. A control device IC ensures that an output voltage from the secondary side of the switch-mode power supply which is applied to the load R is stabilized to be as constant as possible. The TDA 4605 integrated circuit from firm Siemens can be used, for example, as the control device IC.

In the steady state, the control device IC is supplied with voltage at a connection 6, from the primary winding L1 through a rectifier diode D2 and a smoothing capacitor C5. A connection 4 of the control device IC is connected to primary earth or ground. A voltage which can be picked off on the primary winding L1 is supplied, after high-frequency overshoots have been filtered out, to a connection 8 of the control device IC. A control signal which is coupled to the output voltage on the secondary side is supplied at a connection 1 of the control device IC. To this end, that voltage which can be picked off on the secondary winding L3 is transferred to the primary side, through an optocoupler OC, after rectification, smoothing and assessment, for example through the use of a zener diode Z. The control voltage is converted to a desired level range through the use of a voltage divider R3, R4. An output connection 5 of the control device IC is connected to a control input of the switching transistor T1. A primary current signal, which is coupled to the current flowing through the primary winding L2, is supplied at a connection 2 of the control device IC. To this end, the connection 2 is connected to a non-illustrated RC element which is connected between the output of the bridge rectifier BG and primary earth or ground. When the switching transistor is switched on, the RC element in the control device IC is discharged so that the subsequent charging process indicates the primary current that is flowing.

A (positive-going) switching-on pulse at the output connection 5 of the control device IC is produced when the signal supplied at the connection 8 has a zero crossing. The control voltage at the connection 1 and the primary current signal at the connection 2 are used to turn the switching transistor off. A control error (UV1) is formed for this purpose in a control amplifier V1. A reference voltage of 0.4 V is supplied at a positive input of the control amplifier V1, and the connection 1 is connected to a negative input of the control amplifier V1. The control error UV1 is compared with the primary current signal supplied at the connection 2 in a logic device L. If the primary current signal is greater than the control error UV1, the switching-on pulse at the output 5 is ended and the switching transistor T1 is turned off. This control results in the maximum primary current being readjusted until the control error has reached a desired value and, in consequence, the secondary voltage is at the reference value. In addition, a comparator K1 is provided in the control device IC. The comparator K1 compares the control error UV1 with a threshold value of 1.1 V. The comparator K1 then produces an active output signal when the control voltage UV1 is less than the threshold value of 1.1 V. In the logic device L, this results in the switching transistor T1 being prevented from switching on again. If the control error is low, that is to say the output voltage is high as is the case, for example, at a low load in the standby mode, this results in zero crossings of the signal which is present at the connection 8 of the control device IC being ignored and not being used to switch the switching transistor T1 on. If the secondary voltage falls as a result of the current consumption of the load to be supplied, the control error UV1 increases, so that the output signal of the comparator K1 is deactivated and this allows the switching transistor T1 to switch on again.

A coupling device K ensures that switching-on pulses at the output 5 of the control device IC are coupled, in a low-pass-filtered manner, to the control voltage which is supplied at the connection 1. In detail, the coupling element K is constructed as follows: A switching-on pulse at the output connection 5 of the control device IC is injected through a diode D1 into an energy store. The energy store includes a capacitor C1 which is connected to primary earth or ground, and a discharge resistor R1 which is connected in parallel with the capacitor. The capacitor C1 is continuously charged through the diode D1 by the positive control signal at the output connection 5 during the switched-on phase of the transistor T1. The capacitor C1 is discharged through the resistor R1 during the switched-off phase. A pulse storage device is therefore formed by elements D1, C1 and R1. A voltage U1 which is present on the capacitor C1 is passed to an RC element R2, C4 through a coupling capacitor C2 which cuts off the DC voltage. The capacitor C4 is connected through the voltage divider R3, R4 to the control voltage input connection 1 of the control device IC. A voltage U2 which is present on the capacitor C4 is thus superimposed on the voltage supplied from the optocoupler OC. The RC element R2, C4 ensures that the control voltage U2 is raised after a time delay. This prevents the control voltage from being significantly influenced by the coupling element K during the phase in which the switching transistor T1 is still switched on.

According to further developments of the invention, an emitter follower transistor can be provided between the capacitor C1 and the coupling capacitor C2 in order to amplify the voltage U1. A base-emitter current path through the emitter follower transistor is connected between the capacitor C1 and the capacitor C2. An emitter is connected through a load resistor to primary earth or ground, and a collector is connected to a positive supply voltage, for example to the supply connection 6 of the control device IC. The use of the optocoupler OC has the advantage of causing the secondary voltage which is picked off on the secondary winding L3 to be amplified by the gain of the optocoupler OC. This results in good stabilization of humming influences caused by the rectified mains AC voltage UN.

Signal profiles of the voltages U1, U2 and of a drain voltage UD of the switching transistor T1 will be described below in conjunction with FIG. 2. The switching transistor T1 is switched on between instants $t_0$ and $t_1$. The voltage U1 and the charge capacitor C1 remain constant, since the capacitor C1 is continuously recharged through the diode D1.

At the switching on instant $t_0$, the control voltage present at the connection 1 is low, so that the output signal of the comparator K1 is not activated. At the instant $t_1$, the switching transistor T1 is turned off by the logic device L as a result of the comparison between the control error UV1 and the primary current signal at the connection 2. The voltage U1 which is present on the capacitor C1 is then transferred to the capacitor C4 as a result of appropriate construction of the RC element R2, C4. The voltage U2 rises, so that the control error UV1 is below the switching threshold formed by the comparator K1. The corresponding switching threshold for the voltage U2 is designated US in FIG. 2. The capacitor C4 is gradually discharged through the voltage divider R3, R4 and the current consumption into the connection 1 and at an instant $t_3$ is below the threshold US, and the control error UV1 is once again greater than the switching threshold formed by the comparator K1. The switching transistor T1 is prevented from switching on again by the activated comparator K1 between the instants $t_2$ and $t_3$. The drain voltage UD of the transistor T1 then carries out free-running oscillations. At the instant $t_3$, the control voltage U2 has fallen so far that the comparator K1 is deactivated, and this makes it possible for the switching transistor T1 to switch on again at the next zero crossing of the transformer voltage.

It is particularly advantageous to connect the zero-crossing input connection 8 through a coupling capacitor C3 to the control voltage input connection 1. In consequence, the control voltage U2 falls even further when the switching transistor T1 switches on (zero crossing). This results in the switching transistor T1 being switched on for a longer period. The control system ensures that the waiting time between the instants $t_2$ and $t_3$ is extended, because of the higher secondary voltage coupled through the optocoupler OC, to the control voltage U2. The switching frequency is consequently further stabilized. Furthermore, this assists the switching transistor T1 in switching on again during a minimum of the drain voltage UD, so that switching power losses in the switching transistor T1 are saved.

The reduced standby switching frequency is set coarsely by the magnitude of the capacitor C3. Fine adjustment can be carried out through the resistor R1 or the resistor R2, which define the discharge characteristic for the voltage U1. This construction allows the delay time between the instants $t_1$ and $t_3$ to be set relatively accurately. The switching frequency in the standby mode can accordingly lie just above the audibility limit. At the same time, it remains stable.

During normal operation, with a relatively high load on the secondary side, the control voltage U2 becomes lower as a result of a corresponding input through the optocoupler OC. As soon as the control voltage U2 at the instant of the first zero crossing at the instant $t_2$ no longer reaches the threshold US, that is to say the comparator K1 is not activated, the switching transistor T1 is no longer inhibited from switching on again. The switch-mode power supply operates in the normal free-running mode. In order to avoid load-dependent sudden frequency changes, the RC element R2, C4 should be constructed in such a manner that the maximum of the control voltage U2 does not occur later than the instant $t_2$.

I claim:
1. A switch-mode power supply, comprising:
a transformer having a primary winding and a secondary winding for connection of a load;
a switching transistor being connected in series with said primary winding of said transformer for applying a rectified voltage in a pulsed manner to said primary winding of said transformer;
a control device having:
(a) an output connected to said switching transistor for controlling said switching transistor,
(b) a signal input being connected to said transformer and being controlled by a voltage induced in said transformer,
(c) a control signal input being controlled by a voltage coupled to a secondary voltage, and

(d) a device connected between said control signal input and said output of said control device for inhibiting said switching transistor from switching on when a control error derived from the control signal has a magnitude being less than a threshold value; and a coupling element coupling said output and said control signal input of said control device, said coupling element having a low-pass filter characteristic.

2. The switch-mode power supply according to claim 1, wherein said coupling element has an input side, an output side, an input connected to said output of said control device, an output connected to said control signal input, a pulse storage device on said input side and an element with an RC characteristic on said output side.

3. Switch-mode power supply according to claim 2, wherein said pulse storage device includes a capacitor and a resistor connected in a parallel circuit, and a diode connecting said parallel circuit to said output of said control device.

4. The switch-mode power supply according to claim 3, wherein said coupling element includes a coupling capacitor for a DC voltage output connecting said pulse storage device to said RC element on said output side.

5. The switch-mode power supply according to claim 2, including an amplifier connected between said pulse storage device and said element having an RC characteristic.

6. The switch-mode power supply according to claim 1, including a capacitive coupling of said signal input connected to said transformer and said control signal input of said control device.

7. The switch-mode power supply according to claim 1, wherein said transformer has another secondary winding, and including an optocoupler connecting said control signal input of said control device to said other secondary winding.

* * * * *